United States Patent [19]

Inoue et al.

[11] 4,432,508

[45] Feb. 21, 1984

[54] AUTOMATIC TAPE THREADING DEVICE

[75] Inventors: Yoichi Inoue; Takao Terayama, both of Ibaraki; Susumu Kasai, Sagamihara; Tamotsu Tominaga, Akishima, all of Japan

[73] Assignee: Hitachi, Ltd.; Hitachi Denshi Kabushiki Kaisha, both of Tokyo, Japan

[21] Appl. No.: 338,657

[22] Filed: Jan. 11, 1982

[30] Foreign Application Priority Data

Jan. 14, 1981 [JP] Japan .................................... 56-3216

[51] Int. Cl.³ .............................................. G11B 15/66

[52] U.S. Cl. ...................................... 242/195; 226/92; 242/197; 360/95

[58] Field of Search ............... 242/197, 195, 198, 194, 242/199; 360/83, 95; 352/157, 158, 235; 226/91, 92

[56] References Cited

U.S. PATENT DOCUMENTS

| | | | |
|---|---|---|---|
| 3,136,464 | 6/1964 | Schmid | 242/195 X |
| 3,664,607 | 5/1972 | Trefzger | 242/195 |
| 3,807,652 | 4/1974 | Kruhn et al. | 242/195 |
| 3,898,695 | 8/1975 | Yabu et al. | 242/195 X |
| 3,934,840 | 1/1976 | Inaga | 242/195 |
| 4,335,858 | 6/1982 | Cranna | 242/195 |

FOREIGN PATENT DOCUMENTS 50-14310 2/1975 Japan .

*Primary Examiner*—John M. Jillions
*Assistant Examiner*—Scott J. Haugland
*Attorney, Agent, or Firm*—Antonelli, Terry & Wands

[57] ABSTRACT

An automatic tape threading device for a magnetic recording and reproducing system wherein a leading tape member of a width larger than that of a magnetic tape for threading the magnetic tape in a cartridge through a path of travel of the magnetic tape including the outer circumference of a drum mounting a rotary magnetic head includes a joint member connected to one end portion of the magnetic tape in the cartridge and another joint member connected to one end portion of the leading tape member. The two joint members are brought into engagement with each other conjointly with the attaching of the cartridge to the magnetic recording and reproducing system, and then a takeup reel is actuated to withdraw the magnetic tape from the cartridge through the leading tape member, so as to thereby thread the magnetic tape through the path of travel of the magnetic tape.

6 Claims, 12 Drawing Figures

AUTOMATIC TAPE THREADING DEVICE

BACKGROUND OF THE INVENTION

This invention relates to automatic tape threading devices, and more particularly it is concerned with an automatic tape threading device for a magnetic recording and reproducing system for commercial use.

In a magnetic recording and reproducing system for the automatic tape threading device used has hitherto been mainly of the type in which a magnetic tape having connected thereto a leading tape member of larger width than the magnetic tape having suitable rigidity is wound in a cartridge beforehand, and when it is necessary to effect threading of the magnetic tape the leading tape member is withdrawn from the cartridge and moved in a predetermined path of travel including the outer periphery of a drum having a built-in rotary magnetic head until the leading tape member reaches a takeup reel when the takeup reel is actuated to wind the magnetic tape thereon, to complete threading of the magnetic tape. This type of automatic threading device is what is referred to as a leading tape member withdrawing system. Some disadvantages are associated with this system. For example, when the leading tape member having rigidity is forced into a guide groove, the leading tape member would tend to suffer buckling due to frictional dragging of the leading end of the leading tape member and its vicinity on the guide groove. This tendency is particularly strong when the radius of curvature of a bend in the path of movement in which the magnetic tape moves while being guided is small, making it impossible for the leading tape member to be introduced into the bend. Thus it has hitherto been usual practice to avoid the provision of bends of a small radius of curvature to the path of travel of the magnetic tape in design.

Another type of automatic tape threading device known in the art has generally been referred to as a leading tape member connection system in which a leading tape member of the same width as a magnetic tape is loaded in the predetermined path of travel of the tape while the magnetic tape has connected thereto a pin of a larger length than the tape width. The upper and lower end portions of the pin are interconnected by means of a J-shaped hook connected to one end of the leading tape member which is wound at the other end portion, to thereby carry out automatic tape threading. This connection system has, however, the disadvantage that there is the risk of the connection being disrupted when the magnetic tape is loosened longitudinally during the threading operation. In the event that the connection between the leading tape member and the magnetic tape is disrupted during the tape threading operation, it is impossible to automatically return the tape to the initial condition and try rethreading. To avoid this risk, a proposal has been made to provide means for preventing disruption of the connection in Japanese Patent Application Laid-Open No. 14310/75. The means for preventing the disruption of the connection disclosed therein is of the system in which a magnetic tape is connected to a leading tape member after a cartridge having the magnetic tape wound therein is loaded in the magnetic recording and reproducing system.

SUMMARY OF THE INVENTION

An object of the present invention is to provide an automatic tape threading device of the leading tape member connection system free from the disruption of the connection between the leading tape member and the magnetic tape during the tape threading operation and capable of automatically threading the magnetic tape through a tortuous path of travel of the tape.

Another object is to provide an automatic tape threading device capable of connecting a magnetic tape to a leading tape member conjointly with the loading of a cartridge in a magnetic recording and reproducing system.

The outstanding characteristic of the invention is that, in a magnetic recording and reproducing system wherein a leading tape member of larger width than a magnetic tape is used for threading the cartridge supported magnetic tape through a path of travel of the magnetic tape including the outer periphery of a drum having a built-in rotary magnetic head, connection of an end of the magnetic tape in the cartridge to an end of the leading tape member wound on a takeup reel is effected conjointly with the loading of the cartridge in the magnetic recording and reproducing system, whereby the magnetic tape can be withdrawn from the cartridge as the takeup roll is actuated to thereby thread the magnetic tape through the path of travel thereof.

DESCRIPTION OF THE PREFERRED EMBODIMENT

Figure 1:
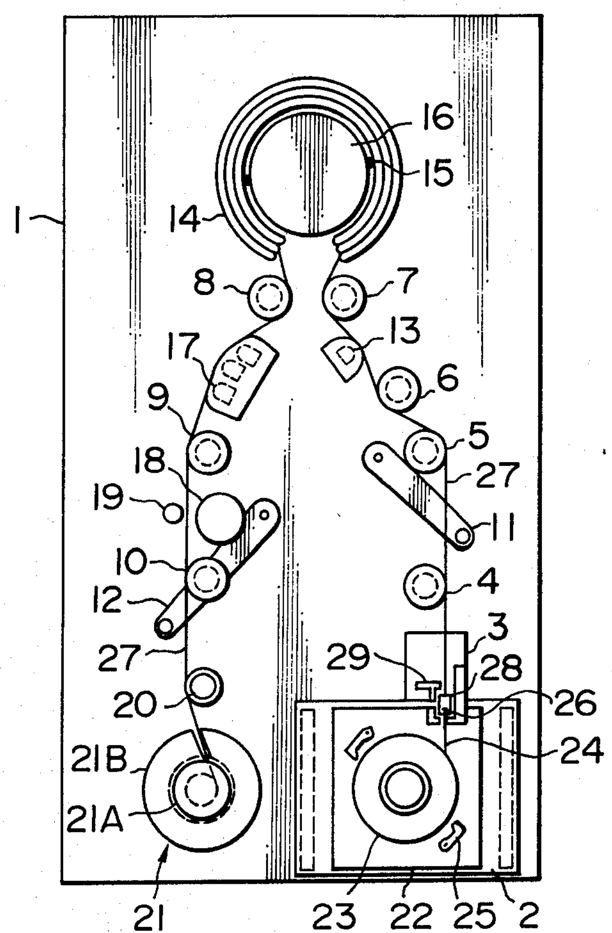
FIG. 1 is a plan view of a magnetic recording and reproducing system having incorporated therein one embodiment of the automatic tape threading device in conformity with the invention.

Referring to FIG. 1, there is shown a magnetic recording and reproducing system having incorporated therein one embodiment of the automatic tape threading device in conformity with the invention. As shown, a base 1 has arranged thereon a cartridge state 2, a joint bed 3, guide posts 4 to 10, tension arms 11 and 12, an eraser head 13, a leading tape portion guide member 14, a drum 16 having a builtin rotary magnetic head 15, a sound head 17, a pinch roller 18, a capstan 19, a timer roller 20 and a takeup reel 21.

The cartridge stage 2 has a cartridge 22 attached thereto and having a magnetic tape 24 wound on a supply reel 23 therein. The supply reel 23 is constructed such that when the cartridge 22 is not attached to the cartridge stage 2 the supply reel 23 is secured in place by a fixing cam 25 in the cartridge 22, but when it is attached to the cartridge stage 2 the supply reel 23 is released from the fixing cam 25. The magnetic tape 24 has connected to one end portion thereof a male type joint member 26 adapted to engage a female type joint member 28 connected to one end portion of a leading tape member 27 for leading the magnetic tape 24. Before the cartridge 22 is attached to the cartridge stage 2, the female type joint member 28 is supported on a stopper 29 on the joint bed 3 at all times. The leading tape member 27 which has a larger width than the magnetic tape 24 is connected at the other end thereof to an inner reel portion 21A of the takeup reel 21 with its portion between the two ends being passed through a path of travel of the magnetic tape 24 including the guide posts 4 to 10, leading tape portion guide member 14, pinch roller 18 and capstan 19. The takeup reel 21 also has an outer reel portion 21B located outside the inner reel portion 21A for winding the magnetic tape 24. The joint member 28 of the leading tape member 27 is connected to the joint member 26 of the magnetic tape 24 conjointly with the loading of the cartridge 22 by the cartridge stage 2.

In the embodiment shown and described hereinabove, the joint member 26 of the magnetic tape 24 is male type, but it may be a female type. When this is the case, the joint member 28 of the leading tape member 27 will naturally be a male type.

The detailed construction of the component parts described hereinabove will now be set forth in some detail. In the description presently to be set forth, parts similar to those shown in FIG. 1 will be designated by like reference characters.

Figure 2:
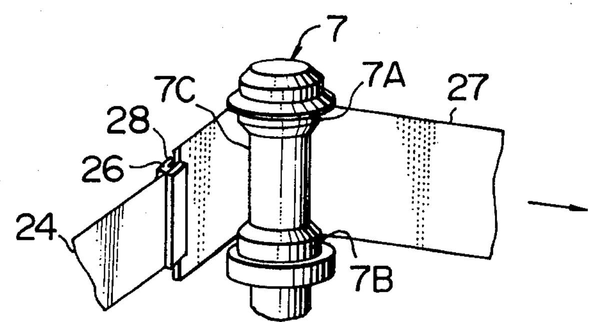
FIG. 2 is a perspective view of the guide post for guiding the leading tape member used in the device according to the invention.
Figure 3:
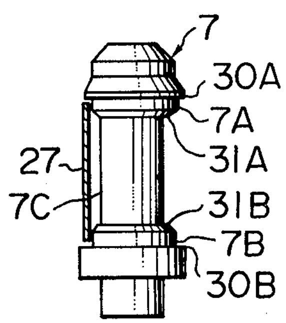
FIG. 3 is a side view of the guide post shown in FIG. 2.

FIGS. 2 and 3 show the construction of the guide posts 4 to 10. In the figures, the guide post 7 will be described as typical of the guide posts 4 to 10.

FIG. 2 shows the leading tape member 27 being guided by the guide post 7 during its travel. Being supported and guided by a leading upper roller 7A and a leading lower roller 7B of the guide post 7, the leading tape member 27 is prevented from coming into contact with a magnetic tape roller 7C. When the guide post 7 guides the magnetic tape 24 of smaller width than the leading tape member 27 as the leading tape member is wound in the direction of an arrow the magnetic tape 24 is brought into contact with the magnetic tape roller 7C and guided thereby because the magnetic tape 24 is smaller in width than the magnetic tape roller 7C.

FIG. 3 shows the guide post 7 in a side view. The widthwise position of the leading tape member 27 is regulated by a flange 30A of the leading upper roller 7A and a flange 30B of the leading lower roller 7B, and the widthwise position of the magnetic tape 24 is regulated by flanges 31A and 31B located in upper and lower portions of the magnetic tape roller 7C, respectively. Thus the positions of the leading tape member 27 and the magnetic tape 24 can be kept constant at all times and no changes are caused to occur in their relative positions, to enable the magnetic tape to travel smoothly.

Figure 4:
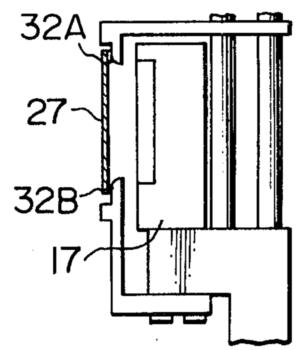
FIG. 4 is a side view of the sound head section used in the device according to the invention.

FIG. 4 shows the construction of the sound head section 17. Like the guide post shown in FIGS. 2 and 3, the sound head section 17 is constructed such that the leading tape member 27 and the magnetic tape 24 are supported by separate portions. More specifically, the sound head section 17 comprises a sound head upper guide 32A and a sound head lower guide 32B for enclosing a front upper side and a front lower side thereof respectively. By virtue of this construction, the leading tape member 27 is guided by the sound head upper guide 32A and the sound head lower guide 32B and prevented from coming into contact with the surface of the sound head 17, thereby avoiding damage to the sound head 17 that might otherwise be caused by scratching.

Figure 5:
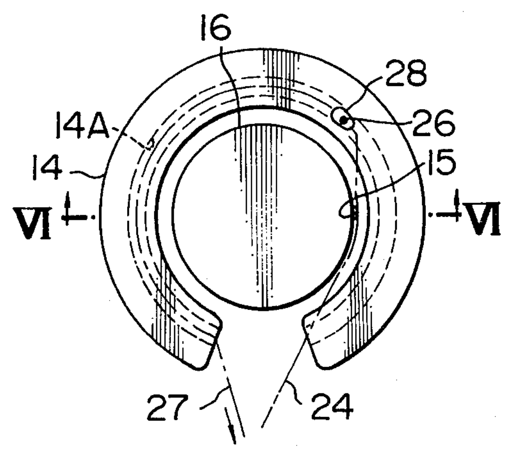
FIG. 5 is a plan view of the drum and the leading tape member guide member used in the device according to the invention.
Figure 6:
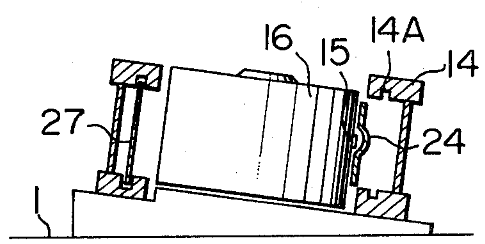
FIG. 6 is a view as seen in the direction of arrows VI—VI in FIG. 5.

FIG. 5 is a plan view showing the leading tape member 27 pulling out the magnetic tape 24 and winding same on the outer circumference of the drum 17 supporting the rotary magnetic head 15. As shown, the leading tape member guide member 14 is constructed such that it has a groove 14A large enough for the leading tape member 27 of large width alone to move therein and therethrough. Thus the magnetic tape 24 moves through a path separate from the path of movement of the leading tape member 27, to prevent the magnetic head 15 from coming into contact with the leading tape member 27 and the joint. A broken line represents the magnetic tape 24. The drum 16, leading tape member guide member 14 and the magnetic tape 24 in the condition shown in FIG. 5 is shown in section in FIG. 6.

Referring to FIG. 1 again, the base 1 is provided with the cartridge stage 2 which moves the cartridge 22 to a position which is flush with the path of movement of the magnetic tape 24 after the cartridge 22 is attached thereto in a predetermined position.

Figure 7:
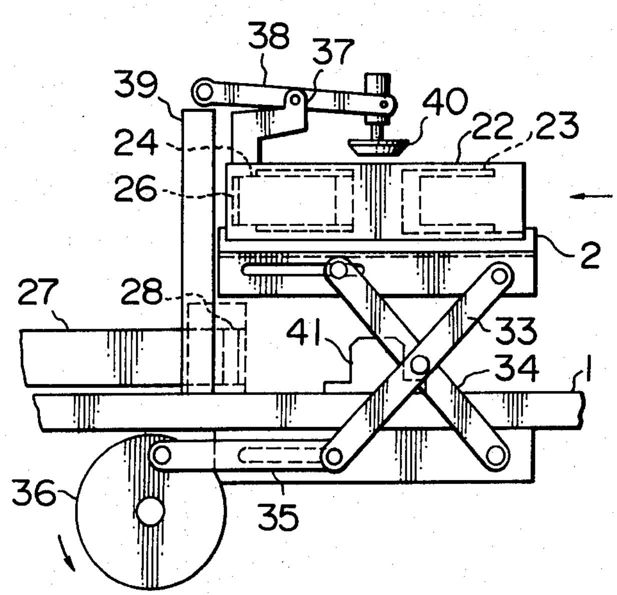
FIG. 7 is a side view of the cartridge stage section used in the device according to the invention.

FIG. 7 shows in a side view the cartridge stage 2. As shown, the cartridge stage 2 is supported by link bars 33 and 34 and the link bar 33 is coupled through a link bar 35 to a drive ring 36. Thus rotation of the drive ring 36 in a counterclockwise direction in FIG. 7 moves downwardly the cartridge 22 placed on the stage 2. A pivot plate 37 is secured to the stage 2 and has supporting thereon a hold-down bar 38 having the height of its left end regulated by the upper end of a post 39. Thus downward movement of the stage 2 causes a hub keep 40 to be moved downwardly through the holddown bar 38. The distance covered by the downward movement of the hub keep 40 is greater than the distance covered by the downward movement of the stage 2, so that the hub keep 40 keeps the supply reel 23 in place and prevents a reel bed 41 and the supply reel 23 from sliding.

When the cartridge 22 moves downwardly, the male type joint member 26 in the cartridge 22 is brought into engagement with the female type joint member 28 standing in readiness on the joint bed 3 on the base 1, conjointly with the donward movement of the cartridge 22.

Figure 8:
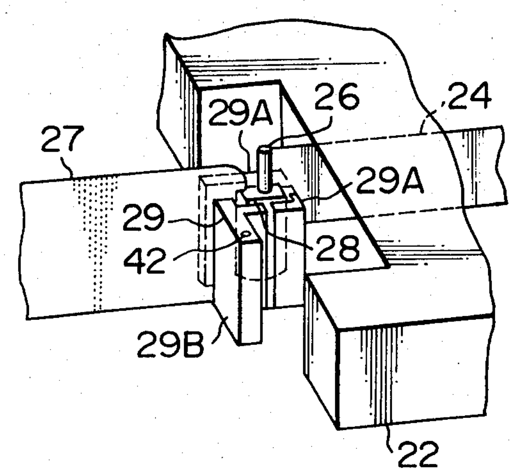
FIG. 8 is a perspective view of the magnetic tape and the leading tape member showing the manner in which they are in engagement with each other.

FIG. 8 shows the manner in which the interfitting of the male joint member 26 and the female joint member 28 takes place. As shown, the female type joint member 28 is positioned by a fixed stopper member 29A and a rotary stopper member 29B constituting the stopper 29. The rotary stopper member 29B is secured to a rotary shaft 42 and rotates through about 45 degrees leftwardly as the rotary shaft 42 rotates whenever the magnetic tape 24 is threaded and a recording or a reproducing operation is performed, to be maintained in the position it reaches by the leftward rotation.

Figure 9:
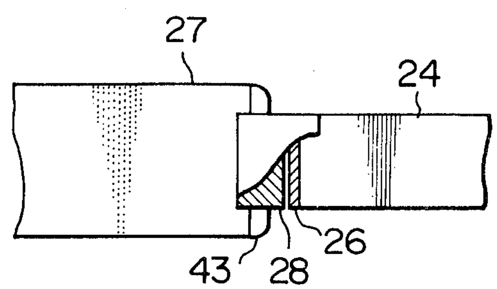
FIG. 9 is a side view of the magnetic tape and the leading tape member showing, partly in section, the portions thereof in which they are engaged with each other.
Figure 10:
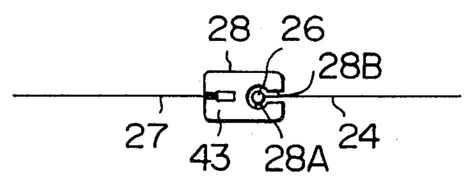
FIG. 10 is a plan view of the magnetic tape and the leading tape member shown in FIG. 9.

FIGS. 9 and 10 show the shape of the male type joint member 26 and the female type joint member 28 when interfitted. The male type joint member 26 has a diameter greater than the thickness of the magnetic tape 24 and is cylindrical in form with a height equal to or smaller than the width of the magnetic tape 24. The female type joint member 28 is formed with a circular opening 28A of an inner diameter larger than the diameter of the male type joint member 26 which is partly out and contiguous with an elongated opening 28B of a size allowing the magnetic tape 24 connected to the male type joint member 26 to pass therethrough. The female type joint member 28 is connected to the leading tape member 27 via an end member 43 of rigid material.

Figure 11:
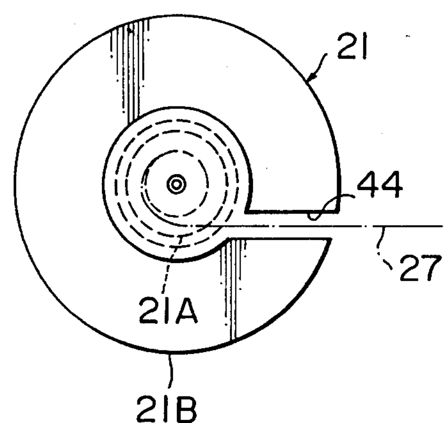
FIG. 11 is a plan view of the takeup reel section used in the device according to the invention.
Figure 12:
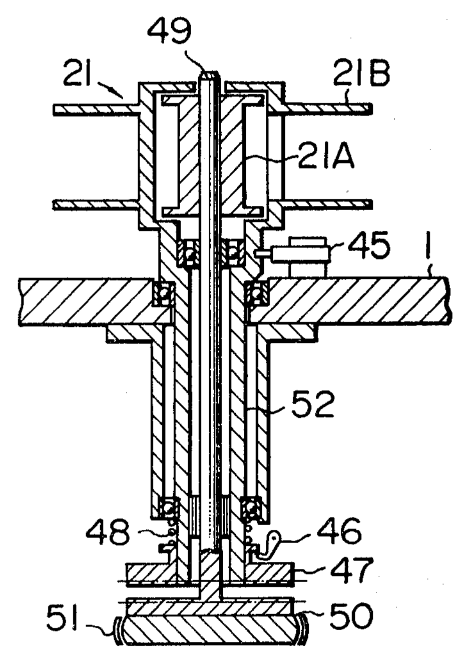
FIG. 12 is a vertical sectional side view of the takeup reel section shown in FIG. 11.

FIGS. 11 and 12 show the construction of a takeup reel section. The outer reel portion 21B of the takeup reel 21, which is for exclusively winding the magnetic tape 24, is formed with an opening 44 for allowing the leading tape member 27 to pass therethrough, as shown in FIG. 11. In threading the magnetic tape 24, rotating and fixed positions are regulated in the opening 44 by a reel stopper 45 in such a manner that the leading tape member 27 does not contact the wall of the opening 44. Thus in threading the magnetic tape 24, a clutch cam 46 moves a clutch upper plate 47 upwardly against the biasing force of a spring 48. At this time, a clutch lower plate 50 alone which is connected to the inner reel portion 21A through an inner shaft 49 is driven for rotation by a drive belt 51. The leading tape member 27 and the joint are wound on the inner reel portion 21A of the takeup reel 21, and when tape threading is completed the reel stopper 45 is disengaged and the clutch cam 46 is also disengaged, to allow the clutch upper plate 47 to be moved downwardly by the biasing force of the spring 48 into meshing engagement with the clutch lower plate 50. Thus in a magnetic recording or reproducing mode, the outer reel portion 21B of the takeup reel 21, which is connected directly to a tubular shaft 52, and the inner reel portion 21A of the takeup reel 21 rotate in synchronism with each other, so that the magnetic tape 24 can be wound on the outer reel portion 21B.

Operation of the automatic tape threading device of the aforesaid construction will now be described.

In initial stages, the leading tape member 27 is secured at one end thereof to the inner reel portion 21A of the takeup reel 21, and the female type joint member 28 at the other end thereof is fixed by the rotary stopper member 29B. The cartridge stage 2 for attaching the cartridge 22 thereto is disposed in a position higher in level than the path of movement of the tape. First of all, the cartridge 22 is moved from the right in the direction of an arrow shown in FIG. 7 and attached to the cartridge stage 2, and the cartridge stage 2 begins to move downwardly. The descending movement of the stage 2 allows interfitting to take place between the male type joint member 26 at the leading end of the magnetic tape 24 in the cartridge 22 and the female joint member 28 of the leading tape member 28, so that they are brought into engagement with each other.

Then, the supply reel 23 of the magnetic tape 24 and the female type joint member 28 are released by the fixing cam 25 and the rotary stopper member 29B respectively, thereby starting tape threading. As shown in FIG. 1, the leading tape member 27 is successively wound by the inner reel portion of the takeup reel 21, to allow the magnetic tape 24 to be payed out of the cartridge 22 and threaded through the eraser head 13, drum 16, sound head 17, capstan 19 and timer roller 20. Tape threading is completed as the joint is wound on the inner reel portion 21A of the takeup reel 21. In recording, reproducing and tape feed modes, the outer reel portion 21B of the takeup reel 21 rotates in synchronism with the inner reel portion 21A thereof, so that the magnetic tape 24 is wound on the outer periphery of the outer reel portion 21B of the takeup reel 21.

In a tape rewind mode, the magnetic tape 24 is rewound until the condition of completion of tape threading is achieved. Thereafter the outer reel portion 21B of the takeup reel 21 is fixed in the position shown in FIG. 1, and the winding of the supply reel 23 is again started to withdraw the leading tape member 27 from the inner reel portion 21A of the takeup reel 21. Upon the female type joint member 28 abutting against the fixed stopper member 29A on the joint bed 3, the rotary stopper member 29B in its open position rotates rightwardly to fix the female type joint member 28. Thus the leading tape member 27 is restored to the condition in which it found itself before initiation of tape threading. Disconnecting of the interfitted joint members is effected as the cartridge stage 2 moves upwardly, and the cartridge 22 is detached from the cartridge stage 2, thereby completing a series of tape threading operations.

From the foregoing description it will be appreciated that according to the invention, interfitting of leading tape member and the magnetic tape can be obtained conjointly with the attaching of a cartridge to the magnetic recording and reproducing system by the cartridge stage, and the joint is formed widthwise of the magnetic tape. Thus the risk of the interfitting being disrupted during tape threading can be avoided, thereby enabling automatic threading of the magnetic tape through a tortuous path of travel can be effected readily and positively.

What is claimed is:

1. An automatic tape threading device suitable for use with a magnetic recording and reproducing system, comprising:

a cartridge having mounted therein a supply reel for winding a magnetic tape thereon;

a takeup reel for winding thereon the magnetic tape and a leading tape member having a greater width than the magnetic tape, said takeup reel being connected to a drive source and located on a base;

a cartridge stage for attaching said cartridge thereto, said cartridge stage being mounted on a base laterally of said takeup reel;

a drum having mounted thereon a magnetic head for writing informtion to and reading out information from the magnetic tape; and an eraser head and a sound head mounted in a path of travel of the magnetic tape;

said leading tape member being connectable to said magnetic tape so that the magnetic tape moves past an outer circumferential surface of said drum as the leading tape member is taken up on the takeup reel;

wherein the improvement comprises:

a support means for shifting the cartridge stage in a direction toward and away from a reel bed on said base in such a manner that a surface of rotation of the supply reel of a cartridge attached to the cartridge stage moves in a direction perpendicular to the surface of the base;

a pair of complementary shaped male and female joint members, one of said joint members being located at an end portion of the leading tape member withdrawn from the takeup reel and moved along the path of travel of the magnetic tape to the vicinity of the cartridge stage and the other of the joint members being located at an end portion of the magnetic tape wound on the supply reel in the cartridge attached to the cartridge stage, said joint member located on the end portion of the leading tape member being constructed and arranged to come into engagement with said joint member on the end portion of the magnetic tape by widthwise movement therebetween, whereby the joint member of the magnetic tape and the joint member of the leading tape member are brought into interfitting engagement with each other as the supply reel of the cartridge is engaged with said reel bed due to shifting of said cartridge stage by said support means.

2. An automatic tape threading device as claimed in claim 1, wherein one of said joint members is in the form of a pin extending widthwise of one of said magnetic tape and leading tape member, and the other of said joint members comprises an opening extending widthwise of the other of said magnetic tape and leading tape member.

3. An automatic magnetic tape threading device as claimed in claim 1, wherein said support means comprises ring bars interposed between the base and the cartridge stage and connected to each other in crossing relation to move the stage widthwise of the tape, and means for driving the ring bars.

4. An automatic tape threading device as claimed in claim 1, wherein the takeup reel includes an inner reel portion for winding only the leading tape member and an outer reel portion located outside the inner reel portion for winding only the magnetic tape thereon, said outer reel portion being formed therein with an opening allowing only the leading tape portion to pass therethrough, means for fixing and releasing the outer reel portion, and means for connecting and disconnecting the inner reel portion and the outer reel portion to a drive constitute a takeup reel section.

5. An automatic tape threading device as claimed in claim 4, wherein said means for fixing and releasing the outer reel portion is operative to fix, when the leading tape member is wound, the outer reel portion in such a manner that the opening allowing the leading tape member to pass therethrough is located on an extension of the direction in which the leading tape member is introduced and to release, when the leading tape member has been wound on the inner reel portion, the outer reel portion.

6. An automatic tape threading device as claimed in claim 4, wherein said means for connecting and disconnecting the inner reel portion and the outer reel portion to the drive comprises a clutch for connecting the outer reel portion to the inner reel portion when the leading tape member has been wound on the inner reel portion.

* * * * *